(12) United States Patent
Veeramani et al.

(10) Patent No.: US 10,684,696 B2
(45) Date of Patent: Jun. 16, 2020

(54) MECHANISM TO ENHANCE USER EXPERIENCE OF MOBILE DEVICES THROUGH COMPLEX INPUTS FROM EXTERNAL DISPLAYS

(71) Applicant: Intel Corporation, Santa Clara, CA (US)

(72) Inventors: Karthik Veeramani, Hillsboro, OR (US); Ujwal Paidipathi, Beaverton, OR (US); Ajit Prakash Joshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/458,703

(22) Filed: Jul. 1, 2019

(65) Prior Publication Data

US 2019/0324554 A1 Oct. 24, 2019

Related U.S. Application Data

(63) Continuation of application No. 14/226,008, filed on Mar. 26, 2014, now Pat. No. 10,338,684.

(51) Int. Cl.
*G06F 3/041* (2006.01)
*G06F 3/01* (2006.01)
*G06F 3/0488* (2013.01)

(52) U.S. Cl.
CPC ............ *G06F 3/017* (2013.01); *G06F 3/0416* (2013.01); *G06F 3/0488* (2013.01)

(58) Field of Classification Search
CPC ....... G06F 3/017; G06F 3/0416; G06F 3/0488
See application file for complete search history.

(56) References Cited

U.S. PATENT DOCUMENTS

2008/0165140 A1* 7/2008 Christie .............. G06F 3/04883
345/173
2008/0309632 A1 12/2008 Westerman et al.
(Continued)

FOREIGN PATENT DOCUMENTS

WO   WO-2010138470 A2   12/2010
WO   WO-2011112033 A2    9/2011
WO   WO-2015148093 A1   10/2015

OTHER PUBLICATIONS

"U.S. Appl. No. 14/226,008, Advisory Action dated Mar. 16, 2016", 4 pgs.
(Continued)

*Primary Examiner* — Insa Sadio
(74) *Attorney, Agent, or Firm* — Schwegman Lundberg & Woessner, P.A.

(57) ABSTRACT

A method of mapping user movements captured by a capture device external to a computing device, to inputs events on the computing device, may comprise executing an application on the computing device, using at least one processor of the computing device. The computing device may transmit video data of the application to a receiver device. The computing device may receive gesture data associated with the application, the gesture data based on movements of a user captured from a capture device communicatively coupled to the receiver device. The gesture data may be mapped to an input event on the computing device and data simulating the input event may be provided to a sensor on the computing device.

20 Claims, 6 Drawing Sheets

(56) References Cited

U.S. PATENT DOCUMENTS

| | | | |
|---|---|---|---|
| 2011/0261213 A1 | 10/2011 | Rottler et al. | |
| 2012/0006247 A1 | 1/2012 | Piter et al. | |
| 2012/0062471 A1* | 3/2012 | Poulidis | H04N 5/4403 345/173 |
| 2012/0198353 A1 | 8/2012 | Lee et al. | |
| 2012/0254463 A1 | 10/2012 | Patoskie | |
| 2014/0043277 A1* | 2/2014 | Saukko | G06F 3/044 345/174 |
| 2014/0130073 A1 | 5/2014 | Yu et al. | |
| 2015/0277568 A1 | 10/2015 | Veeramani et al. | |

OTHER PUBLICATIONS

"U.S. Appl. No. 14/226,008, Appeal Brief filed Nov. 20, 2017", 17 pgs.

"U.S. Appl. No. 14/226,008, Appeal Decision mailed Jan. 31, 2019", 6 pgs.

"U.S. Appl. No. 14/226,008, Examiner Interview Summary dated Jun. 24, 2016", 3 pgs.

"U.S. Appl. No. 14/226,008, Examiners Answer dated Mar. 20, 2018", 10 pgs.

"U.S. Appl. No. 14/226,008, Final Office Action dated May 24, 2017", 18 pgs.

"U.S. Appl. No. 14/226,008, Final Office Action dated Dec. 21, 2015", 18 pgs.

"U.S. Appl. No. 14/226,008, Non Final Office Action dated Jul. 2, 2015", 16 pgs.

"U.S. Appl. No. 14/226,008, Non Final Office Action dated Dec. 23, 2016", 19 pgs.

"U.S. Appl. No. 14/226,008, Notice of Allowance dated Feb. 21, 2019", 5 pgs.

"U.S. Appl. No. 14/226,008, Reply Brief filed May 18, 2018 in response to Examiners Answer dated Mar. 20, 2018".

"U.S. Appl. No. 14/226,008, Response filed Feb. 22, 2016 to Final Office Action dated Dec. 21, 2015", 11 pgs.

"U.S. Appl. No. 14/226,008, Response filed Mar. 23, 2017 to Non Final Office Action dated Dec. 23, 2016", 14 pgs.

"U.S. Appl. No. 14/226,008, Response Filed Jun. 21, 2016 to Advisory Action dated Mar. 16, 2016", 12 pgs.

"U.S. Appl. No. 14/226,008, Response filed Oct. 2, 2015 to Non Final Office Action dated Jul. 2, 2015", 11 pgs.

"International Application Serial No. PCT/US2015/019193, International Preliminary Report on Patentability dated Oct. 6, 2016", 10 pgs.

"International Application Serial No. PCT/US2015/019193, International Search Report dated May 29, 2015", 3 pgs.

"International Application Serial No. PCT/US2015/019193, Written Opinion dated May 29, 2015", 8 pgs.

* cited by examiner

MECHANISM TO ENHANCE USER EXPERIENCE OF MOBILE DEVICES THROUGH COMPLEX INPUTS FROM EXTERNAL DISPLAYS

PRIORITY

This application is a continuation of U.S. patent application Ser. No. 14/226,008, filed Mar. 26, 2014, which is incorporated by reference herein in its entirety.

TECHNICAL FIELD

Embodiments described herein generally relate to input processing and in particular, but not limited to, a mechanism to enhance user experience of mobile devices through complex inputs from external displays.

BACKGROUND

Mobile devices such as phones and tablets may include the ability to connect to external displays. For example, a mobile phone may have a High-Definition Multimedia Interface (HDMI) port to connect to a television or the phone may be able to wirelessly stream video to the television. In some cases, the mobile device may mirror what is being shown on the mobile device to the external display.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Many mobile devices, such as a smart phone, have the ability to stream content from the mobile device to an external display. For example, a user may take a video with the user's mobile phone and then display the video on the user's television set. To accomplish this, the user may establish a connection (e.g., via a wireless or wired connection) between the mobile phone and the television and click or otherwise activate a function on the mobile phone to begin streaming the video from the mobile phone to the television. In some instances everything that is displayed on the mobile phone is mirrored (e.g., displayed) on the television.

In various examples, a user may open an application that is installed on the mobile phone and have the application displayed on the television. The application may be a game in which the sensors of the mobile phone are used to control the game, but the user may view his or her progress of the game on the television. For example, consider that the application is a racing game and that a gyroscope sensor in the mobile phone senses when the user tilts the mobile phone left or right. The racing game then updates the objects (e.g., the car) and displays the change on the mobile phone and, because the mobile phone has a connection to the television, the change will be mirrored on the television.

In an example, the television may be connected to additional input devices that are more complex than sensors installed on the mobile phone. For example, a camera may be placed near or in the television that captures user movement and determines a gesture that the user has made. However, despite the availability of these more complex inputs, any captured inputs made using such devices may not be available to the mobile phone or its running applications.

Accordingly, many application developers do not write applications that take advantage of these complex inputs and instead rely on the sensors and inputs of the mobile phone. In various examples described herein, various mechanisms are described that allows for complex inputs to be mapped back to the sensors of the mobile phone. In various examples, an application developer does not need to change an application to take advantage of these complex inputs.

Figure 1:
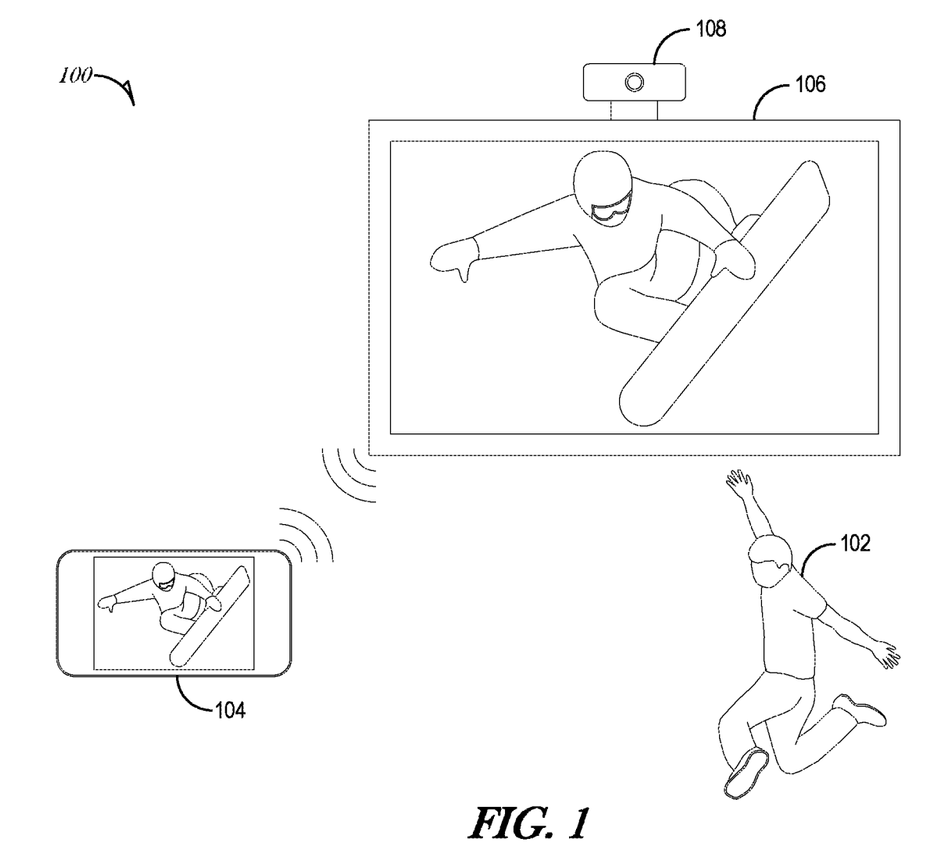
FIG. 1 is an illustration of a user interacting with an external display, according to an embodiment.

FIG. 1 is an illustration 100 of a user 102 interacting with an external display 106, according to an embodiment. The illustration 100 further depicts a computing device 104 and a capture device 108. As illustrated, the display of computing device 104 is showing an image that is that same as that displayed on external display 106. Additionally, the user 102 is making a jumping motion which is partially reflected by the snowboarding character being displayed on the computing device 104 and the external display 106.

Figure 2:
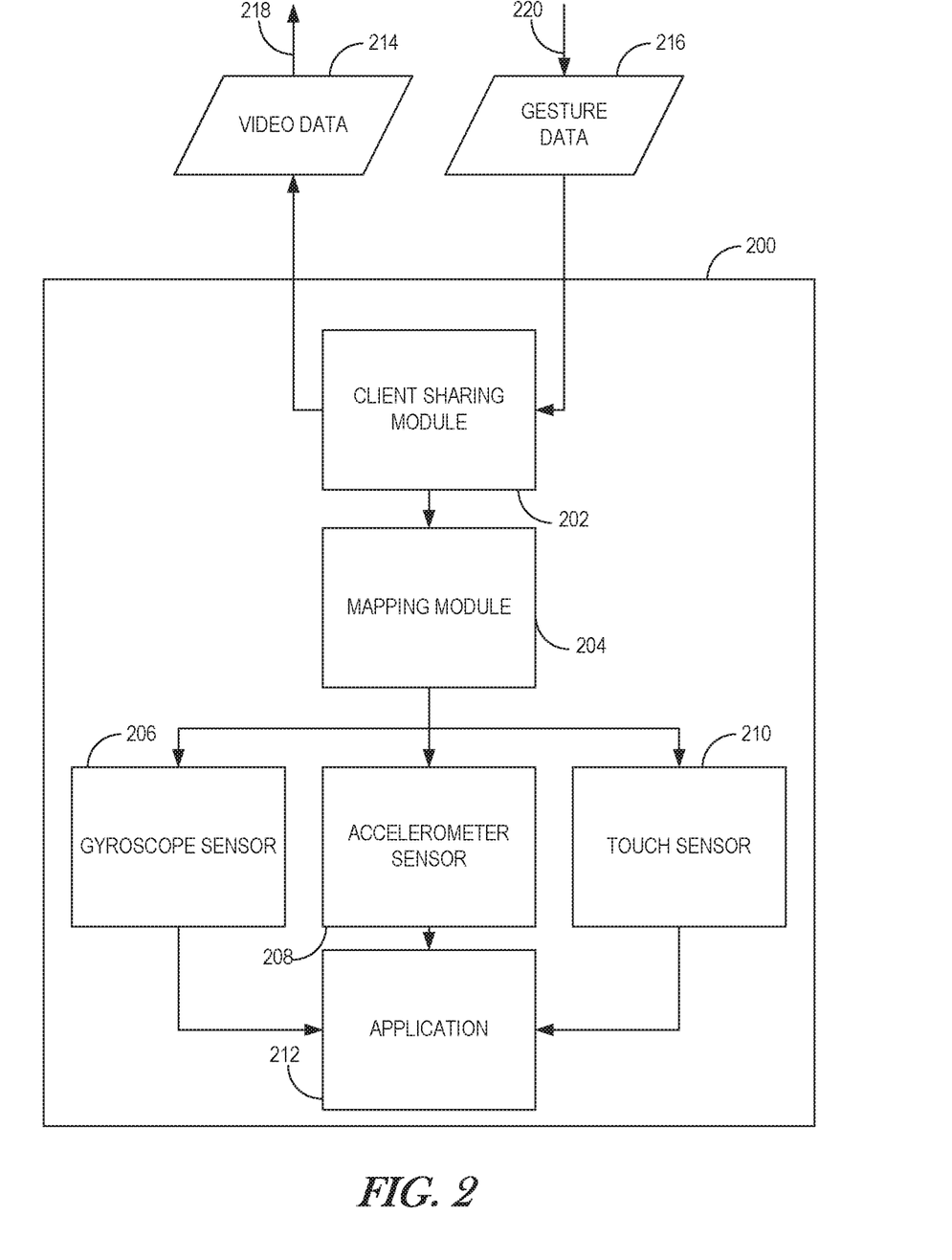
FIG. 2 is a block diagram illustrating a computing device, according to an embodiment.

FIG. 2 is a block diagram illustrating a computing device 200, according to an embodiment. The computing device may include a client sharing module 202, a mapping module 204, a gyroscope sensor 206, an accelerometer sensor 208, a touch sensor 210, an application 212, video data 214, gesture data 216, a video channel 218, and an input channel 220.

In various examples, the computing device 200 is a portable device including, but not limited to, a smart phone, tablet, or laptop computer. In an example the computing device 104 includes a touch-enabled display. The computing device 104 may include at least one processor that executes operating system software stored on a non-transitory computer-readable medium (e.g., flash storage, RAM, hard drive etc.). The application 212 may also be stored on the same or different non-transitory computer-readable medium. The computing device 104 may have other applications as well that are not illustrated.

Figure 3:
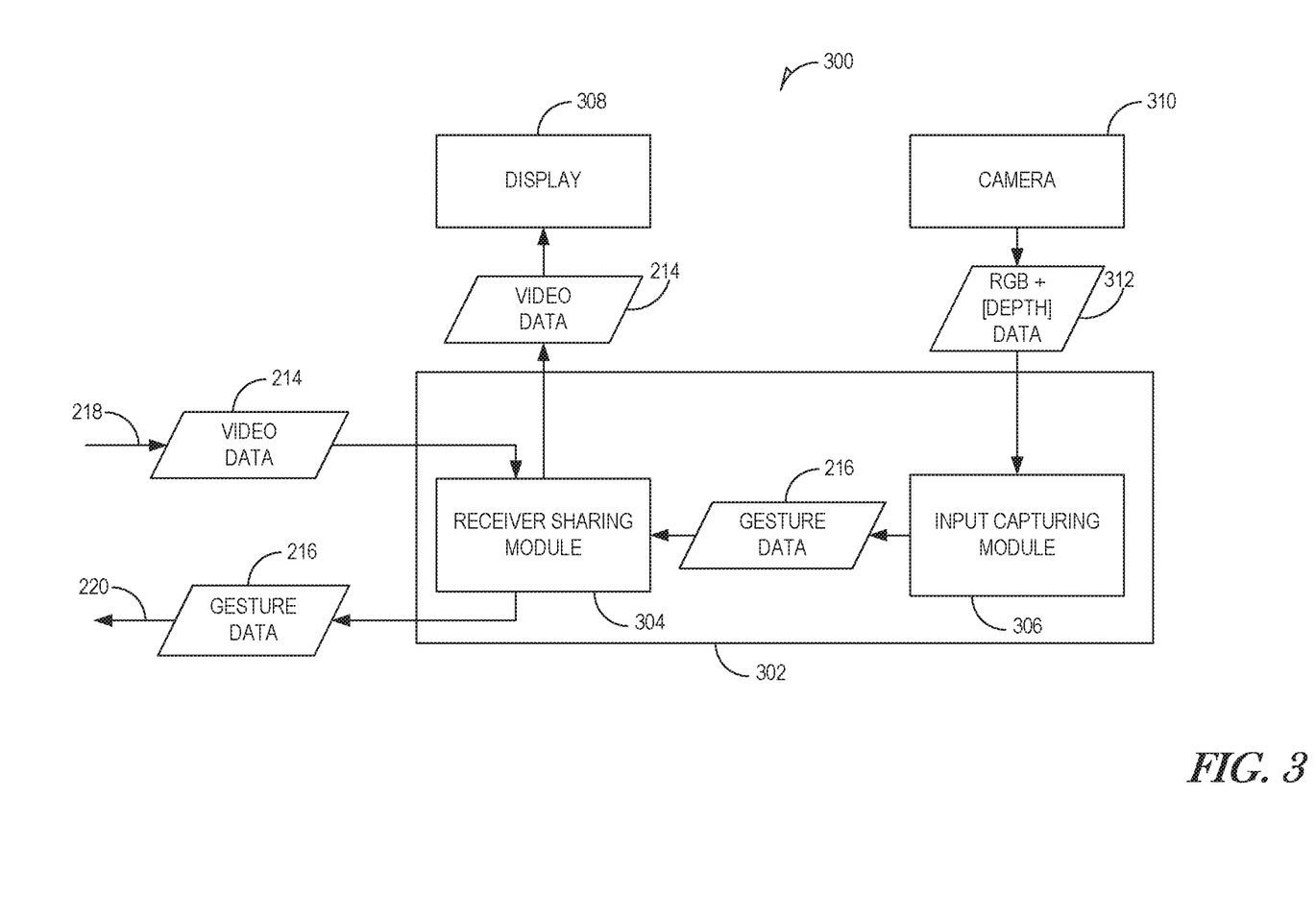
FIG. 3 is a block diagram illustrating a capturing system, according to an embodiment.

In various examples, the computing device 200 establishes one or more connections with a receiver device (e.g., a receiver device 302 illustrated and discussed further herein with respect to FIG. 3). The one or more connections may be used to transfer video data and input data between the computing device 200 and the receiver device. In various example, the connections are wired or wireless (e.g., Wi-Fi, Wi-Fi Direct, Bluetooth, NFC, Ethernet). Different types of data may also be transferred between the computing device 200 and the receiver device 302 over the connections. Additionally, the data may be carried over the connections using different communication protocols.

In various example, the computing device 200 and receiver device 302 communicate via a network. The network may include local-area networks (LAN), wide-area networks (WAN), wireless networks (e.g., 802.11 or cellular network), the Public Switched Telephone Network (PSTN) network, ad hoc networks, personal area networks or peer-to-peer (e.g., Bluetooth®, Wi-Fi Direct), or other combinations or permutations of network protocols and network types. The network may include a single local area network (LAN) or wide-area network (WAN), or combinations of LAN's or WAN's, such as the Internet.

In various examples, a user may direct the computing device 200 to establish one of the above described connections with a compatible receiver device. For example, a user may launch the application 212 and the application 212 may present an option to share or mirror video of the application with an external device. The option may include a list of compatible (e.g., able to receive streaming video) devices within range of the computing device such as TVs. A user may select one of the available devices and then the computing device 302 may transmit a request to the selected device to initiate video streaming to the selected device. The application 212 may be a gaming application, video playback application, music playback application, according to various example embodiments.

FIG. 2 illustrates two data channels, the video channel 218 and the input channel 220 which may be transmitted over one or more of the connections described previously. Thus, in various examples, the video data 214 may be transmitted on a separate data channel than the gesture data 216, however, in other embodiments a shared data channel may be utilized. The data channels may use different protocols to transmit the video data 214 and gesture data 216.

For example, the video data 214 may be transmitted to a receiver device using the real-time transport protocol (RTP) over the video channel 218, whereas the gesture data 216 may be received by the computing device 214 using a user input back channel (UIBC) or consumer electronics control (CEC) over the input channel 220. In various examples, client sharing module 202 handles the transmission of the video data 214 and reception of the gesture data 216.

In various examples, the video data 214 is a video stream of the application 212 currently being executed and displayed on a display of the computing device 200. In an example, the video data 214 is not displayed on the computing device 200 but it still associated with an application executing on the computing device 200 (e.g., the display of the computing device is off because to user is using a TV for the display of the application). The video data 214 may be compressed by the client sharing module 202 before being transmitted. For example, various Wi-Fi based screen sharing frameworks (e.g., Intel WiDi®, Apple Airplay®, Miracast) compress the video using one or more codecs (e.g., H.264) because the wireless connection may not be able to support the full bitrate of the video.

In various examples, the gesture data 216 is data identifying one or more movements made by the user. The gesture data 216 may include a type of movement and characteristics of the movement. Types of movement may include, but are not limited to leaning movements, swiping movements, and shaking movements. Different types of movements may have different characteristics. For example, a lean movement may include a direction characteristic (e.g., forward, backward, left, right) and degree characteristic (e.g., 30 degrees) whereas a swiping movement may only have a direction characteristic.

In various examples, the mapping module 204 maps the gesture data 216 into an input event and provides data simulating the input event to a sensor of the computing device 200. The table below is an example mapping of gesture data to sensors:

| User Gesture | Translated Input Event | Sensor to simulate input event |
|---|---|---|
| Leaning to the left/right | Rotation events of 0 to −/+90 degrees (left/right rotation) | Gyroscope |
| Swiping motion to the left/right | Multiple touch events ranging from middle of the screen towards the mid- left/mid-right end of the screen | Touch |
| Shaking motion/Gestures | Acceleration events (e.g., movement of the device) how fast the device was moved) | Accelerometer |
| Pick-up gesture | Placing a hand or object near the face of the mobile device | Proximity Sensor |

The above table provides various examples, and others mappings and user gestures may be used. The mappings between gestures, input events, and sensors may be stored on the computing device 200 and accessed by the mapping module 204 when processing the gesture data 216.

The data received by the sensor may be based on the mapping and characteristics of the gesture data 216. For example, consider a user who make a leaning gesture to the left approximately half-way to parallel to the floor. The gesture data 216 may identify the gesture as a lean movement with a direction characteristic of left and a degree characteristic of 45. Then, the mapping module 214 may translate the movement into a rotate input event to the left of 45 degrees. Finally, the mapping module 214 may provide data to the gyroscope consistent with a user rotating the computing device 45 degrees to the left thereby simulating the input event. In various examples, gesture data that translates to a touch event include coordinate data representing the touch points on the screen. In an example, the sensor may be a "dumb" sensor that outputs raw data based on movements of the phone and thus providing data directly to the sensor may not be practical. In such cases the simulated data may be provided to a driver of the sensor, and therefore the input event may still be simulated with no change to the application 212.

In various examples, the application 212 updates based on the data provided to the sensors. In other words, even though the computing device 200 was not actually moved or touched, the sensors of the computing device 200 provide data to the application 212 as if this was true, and the application 212 updates accordingly.

In addition to motion gestures, voice data received via the receiver device may also be transmitted to the computing device 200 via the input channel 220. The voice data may be mapped to one or more sensors. For example, voice recognition may be run on the voice data and the resulting word(s) matched to a gesture event such as having the word "back" mapped to a swipe left. Then, the gesture may be mapped to a sensor as described above.

FIG. 3 is a block diagram illustrating a capturing system 300, according to an embodiment. Capturing system 300 may include the receiver device 302, the receiver sharing module 304, the input capturing module 306, the display 308, the camera 310, movement data 312, and red, green, blue (RGB) and depth data 312. While the receiver device 302, display 308, and camera 310 are illustrated as separate components, these devices may all be part of a shared system (e.g., a television with a built-in camera). In various examples, the receiver device 302 and the camera 310 are communicatively coupled to the display 308 (e.g., via a USB connection).

In various examples, the receiver sharing module 304 is the companion to the client sharing module 202 and have a common sharing framework. In an example, the client sharing module 202 may be considered the source and the receiver sharing module 304 the "sink." In various examples, the receiver sharing module 304 receives the video data 214 over the video channel 218 and the gesture data 216 is transmitted to the computing device 200 via the input channel 220. Additionally, the receiver sharing module 304 transmit the video data 214 to the display 308, which in turn displays the video data. In some examples, the receiver sharing module 304 decompresses the video data 214 before transmitting it to the display 308.

In an example, the receiver sharing module 304 receives the gesture data 216 from the input capturing module 306. To generate the gesture data 216, the input capturing module 306 may process the RGB and depth data 312 captured by the camera 310. In an example, a user makes movements/gestures to interact with objects displayed in the video data 218 of the application 212. These gestures/movements may be captured as a series of frames that each include color information (e.g., RGB data) and depth information (e.g., how far away from the camera 310 each point in the frame is), collectively user movement data.

In an example, various gesture detecting frameworks may be utilized by the input capturing module 306 to analyze the RGB and depth data 312. For example, the analysis may track objects (e.g., a hand) present in the RGB and depth data 312 over a series of frames and match the movement to a profile of user gestures. The results of the analysis may be a user gesture type and characterizations of the gesture that is packaged as the gesture data 216.

Figure 4:
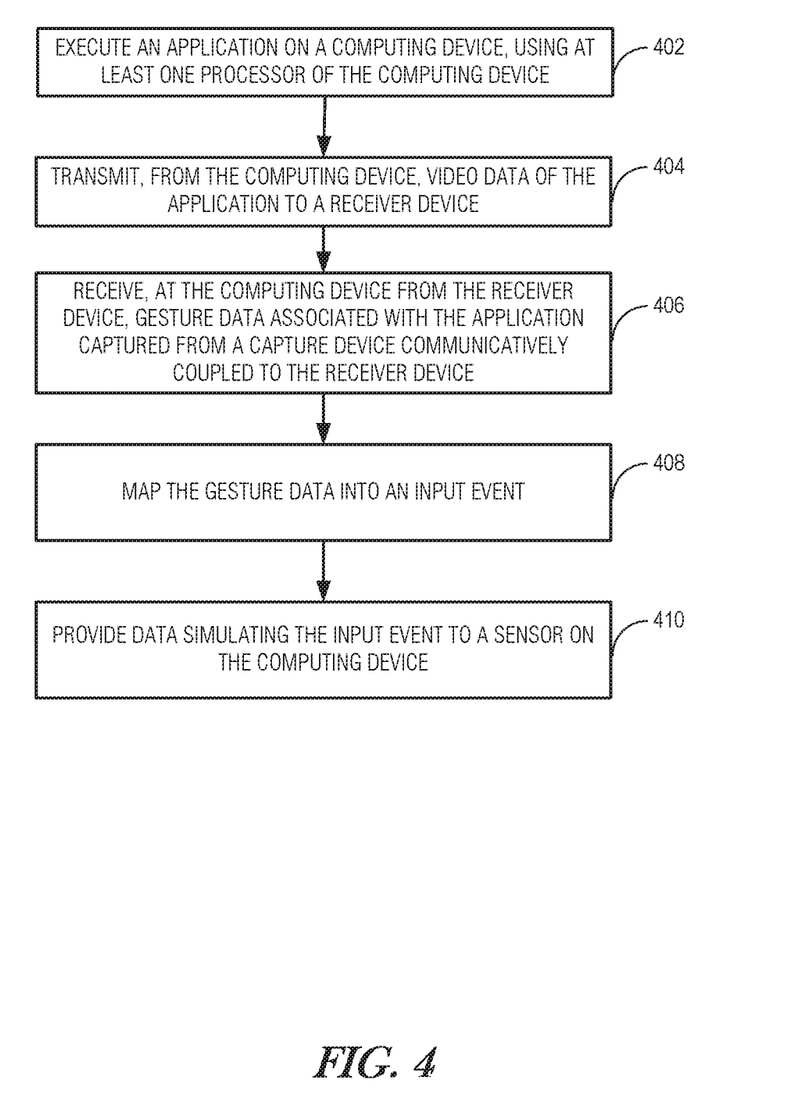
FIG. 4 is a flow chart illustrating a method of mapping inputs from a receiver device to a computing device, according to an embodiment.

FIG. 4 is a flow chart illustrating a method of mapping inputs from a receiver device to a computing device, according to an embodiment. In an example, at operation 402, an application is executed on a computing device, using at least one processor of the computing device. For example, a user may select an icon, representing a gaming application, on the touch screen of a smart phone to open the application.

In an example, at operation 404, video data from the computing device is transmitted to a receiver device. The receiver device may be a device communicatively coupled to a display or be part of the display itself. In an example, one or more data channels are established between the receiver device and the computing device. For example, a video channel (e.g., over an HDMI cable or WiDi) may be established and the video data transmitted over the video channel. In various examples, video displayed on a display of the computing device is streamed to the receiver device over the video channel.

In an example, at operation 406, gesture data is received at the computing device from the receiver device. In an example, the gesture data is received over an input channel established between the receiver device and the computing device. The input channel may be established separately than the video channel.

The gesture data may be associated with the application captured from a capture device communicatively coupled to the receiver device. In an example, associated means that a user has made a movement or gesture related to objects displayed on a display communicatively coupled to the receiver device or related to a function of the application. In an example, the capture device is a camera. In an example, the gesture data includes a type of gesture (e.g., a lean) and characteristics of the gesture (e.g., speed, angle, position).

In an example, at operation 408, the gesture data may be mapped to an input event. For example, a table or other data structures may be accessed that include a mapping of types of gestures to input events associated with the computing device. For example, a lean gesture type may be stored as associated with a rotate input event consistent with rotating the computing device. In an example, at operation 410, data simulating the input event is provided to a sensor on the computing device. Continuing the example of a lean event, data simulating rotating the computing device may be provided to a gyroscope of the computing device. In an example, where the input event is a touch input event, data simulating a touch event may be provided to a touch sensor (e.g., the touch display) of the computing device. In an example, the video data may be updated based on the application responding to sensors receiving the simulated events. The updated video data may be transmitted to the receiver device.

Figure 5:
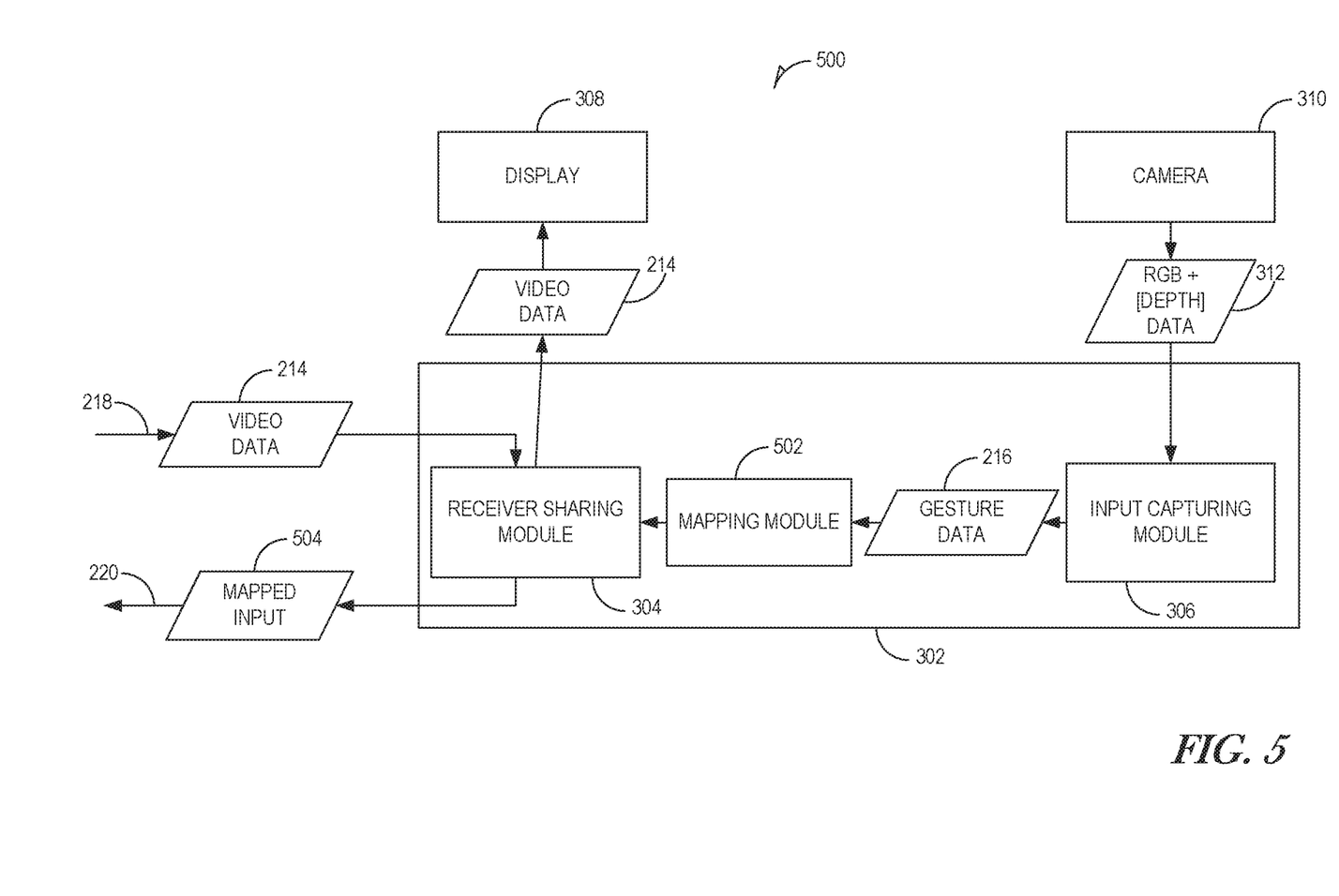
FIG. 5 is a block diagram illustrating a capturing system, according to an embodiment.

FIG. 5 is a block diagram illustrating a capturing system 500, according to an embodiment. Capturing system 500 may be similar to capturing system 300 except that capturing system 500 includes a mapping module 502 and mapped input 504. Thus, in various examples instead of, or in addition to, a mobile computing device having a mapping module, the capturing system 500 may include the mapping module 502. In such instances, the gesture data 216 may be passed first to the mapping module 502.

Similarly to the mapping module 204, the mapping module 502 may map the gesture data 216 to an input event and generate data simulating the event. The generated data may be transmitted to the computing device 200 as the mapped input 504 via receiver sharing module 304 and the input channel 220. The computing device 200 may then take the mapped input 504 and pass the data directly to a sensor of the computing device 200 or a driver of a sensor the computing device 200. In an example, the mapped input 504 include an indication of which sensor to provide the data to on the computing device.

Example Computer System

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
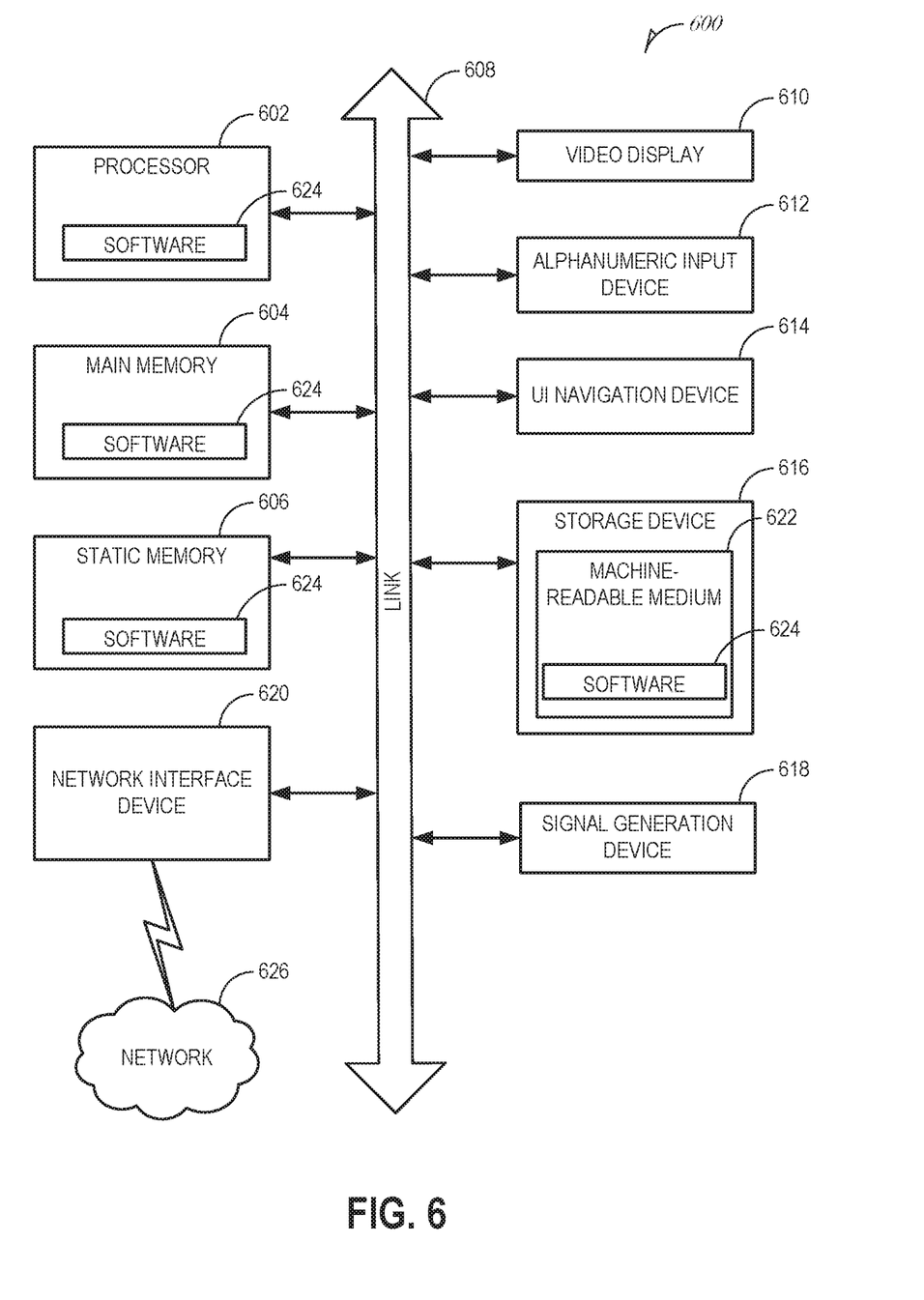
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 includes subject matter (such as a device, apparatus, or machine) comprising a computing device for mapping user movements captured by a capture device external to a computing device, to inputs events on the computing device, the computing device comprising: a display to display an application executing on the computing device; a client sharing module to: transmit video data of the application to a receiver device; and receive gesture data associated with the application, the gesture data based on movements of a user captured from a capture device communicatively coupled to the receiver device; and a mapping module to: map the gesture data into an input event on the computing device; and provide data simulating the input event to a sensor of the computing device.

In Example 2, the subject matter of Example 1 may include, wherein to map the gesture data into an input event on the computing device, the mapping module is to: retrieve a type of movement of the user from the gesture data; and determine the input event based on the type of movement.

In Example 3; the subject matter of any one or more of Examples 1 to 2 may include, wherein when the type of movement of the user is a swipe movement the gesture data is mapped to a touch input event and data simulating the touch input event is provided to a touch sensor of the computing device.

In Example 4, the subject matter of any one or more of Examples 1 to 3 may include, wherein when the type of movement of the user is a lean movement the gesture data is mapped to a rotate input event and data simulating the rotate input event is provided to a gyroscope of the computing device.

In Example 5, the subject matter of any one or more of Examples 1 to 4 may include, wherein the client sharing module is to: establish a video channel between the computing device and receiver device; establish an input channel between the and computing device and receiver device; and wherein the video data is transmitted over the video channel and gesture data is received via the input channel.

In Example 6, the subject matter of any one or more of Examples 1 to 5 may include, wherein to transmit video data of the application to a receiver device the sharing module is to: stream video displayed on the display of the computing device to the receiver device via the video channel.

In Example 7; the subject matter of any one or more of Examples 1 to 6 may include, wherein the client sharing module is to transmit updated video data to the receiver device based on the application updating in response to the input event.

In Example 8, the subject matter of any one or more of Examples 1 to 7 may include, wherein the computing device is a mobile phone.

In Example 9, the subject matter of any one or more of Examples 1 to 8 may include, wherein the receiver device is a television.

Example 10 includes or may be combined with the subject matter of any one of Examples 1-9 to include subject matter for mapping user movements captured by a capture device external to a computing device, to inputs events on the computing device (such as a method, means for performing acts, machine readable medium including instructions that when performed by a machine cause the machine to performs acts, or an apparatus configured to perform) comprising executing an application on a computing device, using at least one processor of the computing device; transmitting, from the computing device, video data of the application to a receiver device; receiving, at the computing device from the receiver device, gesture data associated with the application, the gesture data based on movements of a user captured from a capture device communicatively coupled to the receiver device; mapping the gesture data to an input event on the computing device; and providing data simulating the input event to a sensor on the computing device.

In Example 11, the subject matter of Example 10 may include, wherein mapping the gesture data into an input event on the computing device comprises: retrieving a type of movement of the user from the gesture data; and determining the input event based on the type of movement.

In Example 12, the subject matter of any one or more of Examples 10 to 11 may include, wherein mapping the gesture data into an input event further comprises: mapping the gesture data to a touch input event when the type of movement is a swipe movement.

In Example 13, the subject matter of any one or more of Examples 10 to 12 may include, wherein providing the data simulating the input event to the sensor on the computing device comprises: providing data simulating the touch input event to a touch sensor on the computing device.

In Example 14, the subject matter of any one or more of Examples 10 to 13 may include, wherein mapping the gesture data into an input event further comprises: mapping the gesture data to a rotate input event when the type of movement is a lean movement.

In Example 15, the subject matter of any one or more of Examples 10 to 14 may include, wherein providing the data simulating the input event to the sensor on the computing device comprises: providing data simulating the rotate input event to a gyroscope sensor on the computing device.

In Example 16, the subject matter of any one or more of Examples 10 to 15 may include, establishing a video channel between the computing device and receiver device; establishing an input channel between the computing device and the receiver device; and wherein the video data is transmitted over the video channel and gesture data is received via the input channel.

In Example 17, the subject flatter of any one or more of Examples 10 to 16 may include, wherein transmitting video data of the application to a receiver device comprises: streaming video displayed on a display of the computing device to the receiver device via the video channel.

In Example 18, the subject matter of any one or more of Examples 10 to 17 may include, wherein streaming video displayed on a display of the computing device to the receiver device comprises: wirelessly streaming the video to the receiver device.

In Example 19, the subject matter of any one or more of Examples 10 to 18 may include, transmitting updated video data to the receiver device based on the application updating in response to the input event.

Example 20 includes or may optionally be combined with the subject matter of any one of Examples 1-19 to include an apparatus comprising means for performing any of the Examples 1-19.

Example 21 includes an apparatus for mapping user movements captured by a capture device external to the computing device to inputs events on the computing device, the apparatus comprising means for executing an application on the computing device; means for transmitting, from the computing device, video data of the application to a receiver device; means for receiving, at the computing device from the receiver device, gesture data associated with the application, the gesture data based on movements of a user captured from a capture device communicatively coupled to the receiver device; means for mapping the gesture data to an input event on the computing device; and means for providing data simulating the input event to a sensor on the computing device.

Example 22 includes subject matter (such as a device, apparatus, or machine) comprising a capturing system to map user movements captured by a capture device to inputs events on a computing device, the system comprising: a receiver sharing module to receive video data of an application executing on a computing device external to the capturing system; an input capturing module to: receive user movement data of a user; and process the user movement data to determine a user gesture type and output gesture data; a mapping module to: receive the gesture data from the input capturing module; and map the gesture data into an input event on the computing device; generate mapped input data simulating the input event; and wherein the receiver sharing module is to transmit the mapped input data to the computing device.

In Example 23, the subject matter of Example 22 may include, wherein to map the gesture data into an input event on the computing device, the mapping module is to: retrieve a type of movement of the user from the gesture data; and determine the input event based on the type of movement.

In Example 24, the subject matter of any one or more of Examples 22 to 23 may include wherein when the type of movement of the user is a swipe movement the gesture data is mapped to a touch input event and wherein the mapped input data includes data simulating the touch input event for a touch sensor of the computing device.

In Example 25, the subject matter of any one or more of Examples 22 to 24 may include wherein when the type of movement of the user is a lean movement the gesture data is mapped to a rotate input event and wherein the mapped input include data simulating the rotate input event is provided for a gyroscope of the computing device.

Example 26 includes or may be combined with the subject matter of any one of Examples 22-25 to include subject matter for mapping user movements captured by a capture device to inputs events on a computing device (such as a method, means for performing acts, machine readable medium including instructions that when performed by a machine cause the machine to performs acts, or an apparatus configured to perform) comprising receiving video data of an application executing on a computing device external to the capturing system; receiving user movement data of a user; processing the user movement data to determine a user gesture type and output gesture data; mapping the gesture data into an input event for the computing device; generating mapped input data simulating the input event; and transmitting the mapped input data to the computing device.

In Example 27, the subject matter of Example 26 may include wherein mapping the gesture data into an input event for the computing device comprises: retrieving a type of movement of the user from the gesture data; and determining the input event based on the type of movement.

In Example 28, the subject matter of any one or more of Examples 26 to 27 may include wherein when the type of movement of the user is a swipe movement the gesture data is mapped to a touch input event and wherein the mapped input data includes data simulating the touch input event for a touch sensor of the computing device.

In Example 29, the subject matter of any one or more of Examples 26 to 28 may include wherein when the type of movement of the user is a lean movement the gesture data is mapped to a rotate input event and wherein the mapped input include data simulating the rotate input event is provided for a gyroscope of the computing device.

Example 30 includes or may optionally be combined with the subject matter of any one of Examples 1-29 to include an apparatus comprising means for performing any of the Examples 1-29.

Example 31 includes an apparatus for mapping user movements captured by a capture device to inputs events on a computing device, the apparatus comprising means for receiving video data of an application executing on a computing device external to the capturing system; means for receiving user movement data of a user; means for processing the user movement data to determine a user gesture type and output gesture data; means for mapping the gesture data into an input event for the computing device; means for generating mapped input data simulating the input event; and means for transmitting the mapped input data to the computing device.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computing device for mapping user movements captured by a capture device external to the computing device, to inputs events on the computing device, the computing device comprising:
    a display to display an application executing on the computing device;
    at least one processor;
    a storage device comprising instructions, which when executed by the at least one processor, configure the at least one processor to:
        transmit video data of the application to a receiver device external to the computing device;
        receive gesture data associated with the application, the gesture data based on movements of a user captured from a capture device, the capture device external to the computing device and communicatively coupled to the receiver device;
        map the gesture data to an input event on the computing device to generate data simulating the input event; and
        provide the data simulating the input event to a sensor of the computing device.

2. The computing device of claim 1, wherein to map the gesture data into an input event on the computing device, the at least one processor is configured to:
    retrieve a type of movement of the user from the gesture data; and
    determine the input event based on the type of movement.

3. The computing device of claim 2, wherein when the type of movement of the user is a swipe movement, and the gesture data is mapped to a touch input event and data simulating the touch input event is provided to a touch sensor of the computing device.

4. The computing device of claim 2, wherein when the type of movement of the user is a lean movement, and the gesture data is mapped to a rotate input event and data simulating the rotate input event is provided to a gyroscope of the computing device.

5. The computing device of claim 1, wherein the at least one processor is configured to:

establish a video channel between the computing device and receiver device;

establish an input channel between the computing device and receiver device; and wherein the video data is transmitted over the video channel and gesture data is received via the input channel.

6. The computing device of claim 5, wherein to transmit video data of the application to the receiver device the at least one processor is configured to:

stream video displayed on the display of the computing device to the receiver device via the video channel.

7. The computing device of claim 1, wherein the at least one processor is configured to transmit updated video data to the receiver device based on the application updating in response to the input event.

8. The computing device of claim 1, wherein the computing device is a mobile phone.

9. The computing device of claim 1, wherein the receiver device is a television.

10. A method of mapping user movements captured by a capture device external to a computing device, to inputs events on the computing device, the method comprising:

executing an application on the computing device, using at least one processor of the computing device;

transmitting, from the computing device, video data of the application to a receiver device external to the computing device;

receiving, at the computing device from the receiver device, gesture data associated with the application, the gesture data based on movements of a user captured from a capture device, the capture device external to the computing device and communicatively coupled to the receiver device;

mapping the gesture data to an input event on the computing device to generate data simulating the input event; and providing data simulating the input event to a sensor on the computing device.

11. The method of claim 10, wherein mapping the gesture data to the input event on the computing device comprises:

retrieving a type of movement of the user from the gesture data; and determining the input event based on the type of movement.

12. The method of claim 11, wherein mapping the gesture data to the input event further comprises:

mapping the gesture data to a touch input event when the type of movement is a swipe movement.

13. The method of claim 12, wherein providing the data simulating the input event to the sensor on the computing device comprises:

providing data simulating the touch input event to a touch sensor on the computing device.

14. The method of claim 11, wherein mapping the gesture data to the input event further comprises:

mapping the gesture data to a rotate input event when the type of movement is a lean movement.

15. The method of claim 14, wherein providing the data simulating the input event to the sensor on the computing device comprises:

providing data simulating the rotate input event to a gyroscope sensor on the computing device.

16. The method of claim 10, further comprising:

establishing a video channel between the computing device and receiver device;

establishing an input channel between the computing device and the receiver device; and wherein the video data is transmitted over the video channel and gesture data is received via the input channel.

17. The method of claim 16, wherein transmitting video data over the video channel comprises:

streaming video displayed on a display of the computing device to the receiver device via the video channel.

18. The method of claim 17, wherein streaming video displayed on the display of the computing device to the receiver device comprises:

wirelessly streaming the video to the receiver device.

19. The method of claim 10, further comprising:

transmitting updated video data to the receiver device based on the application updating in response to the input event.

20. At least one non-transitory machine-readable storage medium including instructions for mapping user movements captured by a capture device external to a computing device to inputs events on the computing device, which when executed by a machine, cause the machine to perform operations comprising:

executing an application on the computing device;

transmitting, from the computing device, video data of the application to a receiver device external to the computing device;

receiving, at the computing device from the receiver device, gesture data associated with the application, the gesture data based on movements of a user captured from a capture device, the capture device external to the computing device and communicatively coupled to the receiver device;

mapping the gesture data to an input event on the computing device to generate data simulating the input event; and providing data simulating the input event to a sensor on the computing device.

* * * * *